(12) United States Patent
Marukawa et al.

(10) Patent No.: US 10,247,602 B2
(45) Date of Patent: Apr. 2, 2019

(54) CONFOCAL MEASURING DEVICE

(71) Applicant: OMRON Corporation, Kyoto (JP)

(72) Inventors: Mariko Marukawa, Fukuchiyama (JP);
Masayuki Hayakawa, Kizugawa (JP);
Takahiro Okuda, Kyoto (JP);
Hisayasu Morino, Fukuchiyama (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 15/846,205

(22) Filed: Dec. 19, 2017

(65) Prior Publication Data

US 2018/0259390 A1 Sep. 13, 2018

(30) Foreign Application Priority Data

Mar. 9, 2017 (JP) .................. 2017-045272

(51) Int. Cl.
*G01B 11/24* (2006.01)
*G01J 1/42* (2006.01)
*G01J 1/04* (2006.01)

(52) U.S. Cl.
CPC ........... *G01J 1/4257* (2013.01); *G01J 1/0411* (2013.01)

(58) Field of Classification Search
CPC .............. G11B 7/1353; G11B 7/1374; A61F 2009/00897; G02B 26/10; G02B 5/1814; G02B 3/08; B29D 11/00269; B29D 11/00769; G01J 3/18
USPC ................ 356/328, 330, 305; 359/389, 742; 369/112.12, 112.23
See application file for complete search history.

(56) References Cited

U.S. PATENT DOCUMENTS

| 6,188,514 | B1 * | 2/2001 | Saito ................ G02B 21/0052 |
| | | | 359/234 |
| 6,834,036 | B1 * | 12/2004 | Shiono .................. G11B 7/123 |
| | | | 369/112.03 |
| 8,212,997 | B1 | 7/2012 | Xie |
| 8,654,352 | B1 * | 2/2014 | Deng ..................... G01B 11/24 |
| | | | 356/600 |
| 8,773,757 | B2 | 7/2014 | Chen et al. |
| 9,477,091 | B2 | 10/2016 | Abrahamsson et al. |

(Continued)

FOREIGN PATENT DOCUMENTS

| EP | 2708934 A1 * | 3/2014 |
| JP | H10221607 | 8/1998 |

(Continued)

OTHER PUBLICATIONS

"Office Action of Taiwan Counterpart Application," with English translation thereof, dated Sep. 26, 2018, p. 1-p. 18.

(Continued)

*Primary Examiner* — Hoa Q Pham
(74) *Attorney, Agent, or Firm* — JCIPRNET

(57) ABSTRACT

A confocal measuring device capable of enlarging a measurement range using a compact device configuration is provided. A confocal measuring device (1A) is configured to include: a diffractive lens (11) that causes chromatic aberration in light emitted from a white LED light source (21); a diffractive lens (13b) that increases chromatic aberration of light passing through the diffractive lens (11); and an objective lens (12) that condenses light into a measurement target range such that the condensed light has chromatic aberration along an optical axis.

20 Claims, 8 Drawing Sheets

(56) References Cited

U.S. PATENT DOCUMENTS

| | | | |
|---|---|---|---|
| 2001/0021163 A1* | 9/2001 | Yukawa | G11B 7/127 369/112.12 |
| 2003/0185134 A1* | 10/2003 | Kimura | G11B 7/1275 369/112.08 |
| 2006/0109483 A1 | 5/2006 | Marx et al. | |
| 2008/0186551 A1* | 8/2008 | Hanft | A61F 9/0084 359/205.1 |
| 2009/0303600 A1* | 12/2009 | Matsumoto | G02B 13/00 359/576 |
| 2012/0075704 A1* | 3/2012 | Ando | G02B 5/1814 359/574 |
| 2016/0165105 A1 | 6/2016 | Frayer | |

FOREIGN PATENT DOCUMENTS

| | | |
|---|---|---|
| JP | 2012-173294 | 9/2012 |
| JP | 2012-208102 | 10/2012 |
| KR | 1020140035795 | 3/2014 |

OTHER PUBLICATIONS

Office Action of Korea Counterpart Application, with English translation thereof, dated Dec. 14, 2018, pp. 1-8.

\* cited by examiner

CONFOCAL MEASURING DEVICE

CROSS-REFERENCE TO RELATED APPLICATION

This application claims the priority of Japan patent application serial no. 2017-045272, filed on Mar. 9, 2017. The entirety of the above-mentioned patent application is hereby incorporated by reference herein and made a part of this specification.

BACKGROUND

Technical Field

The disclosure relates to a confocal measuring device using a confocal optical system.

Description of Related Art

Measuring devices measuring displacement of measurement target objects in a non-contact manner are known as conventional technologies. Among them, various technologies relating to measuring devices measuring displacement using confocal optical systems have been disclosed. For example, in Patent Document 1, a confocal measuring device suppressing variations in the accuracy of measurement of displacement of a measurement target object according to a wavelength of light by combining an objective lens and a diffractive lens is disclosed.

In Patent Document 2, a chromatic confocal point sensor optical pan including a plurality of axial dispersion focusing elements for realizing a broad measurement target range is disclosed.

Meanwhile, in a confocal measuring device, a broad measurement target range is acquired.

For example, in the technology disclosed in Patent Document 1, in order to enlarge a measurement target range, increasing the focal distance of the objective lens may be considered. However, when the focal distance of the objective lens is simply increased, a measurement center distance changes, and the performance markedly changes, In addition, in the technology disclosed in Patent Document 2, in order to bring light in focus in an area among the plurality of axial dispersion focusing elements, distances among the plurality of axial dispersion focusing elements increase. Thus, the size of the chromatic confocal point sensor optical pan increases.

[Patent Document 1] Japanese Patent Application Laid-Open (JP-A) No. 2012-208102

[Patent Document 2] Japanese Patent Application Laid-Open (JP-A) No. 2012-173294

SUMMARY

A confocal measuring device according to one or some exemplary embodiments of the invention is a confocal measuring device using a confocal optical system and is configured to include: a light source that emits light having a plurality of wavelengths; a first diffractive lens that causes chromatic aberration in the light emitted from the light source; a second diffractive lens that increases chromatic aberration of light passing through the first diffractive lens; an objective lens that condenses light passing through the second diffractive lens into a measurement target range along an optical axis such that the condensed light has chromatic aberration along the optical axis; and a measurement part that measures strength of light of a wavelength focused on a measurement target object among light condensed by the objective lens.

DESCRIPTION OF THE EMBODIMENTS

Figure 1:
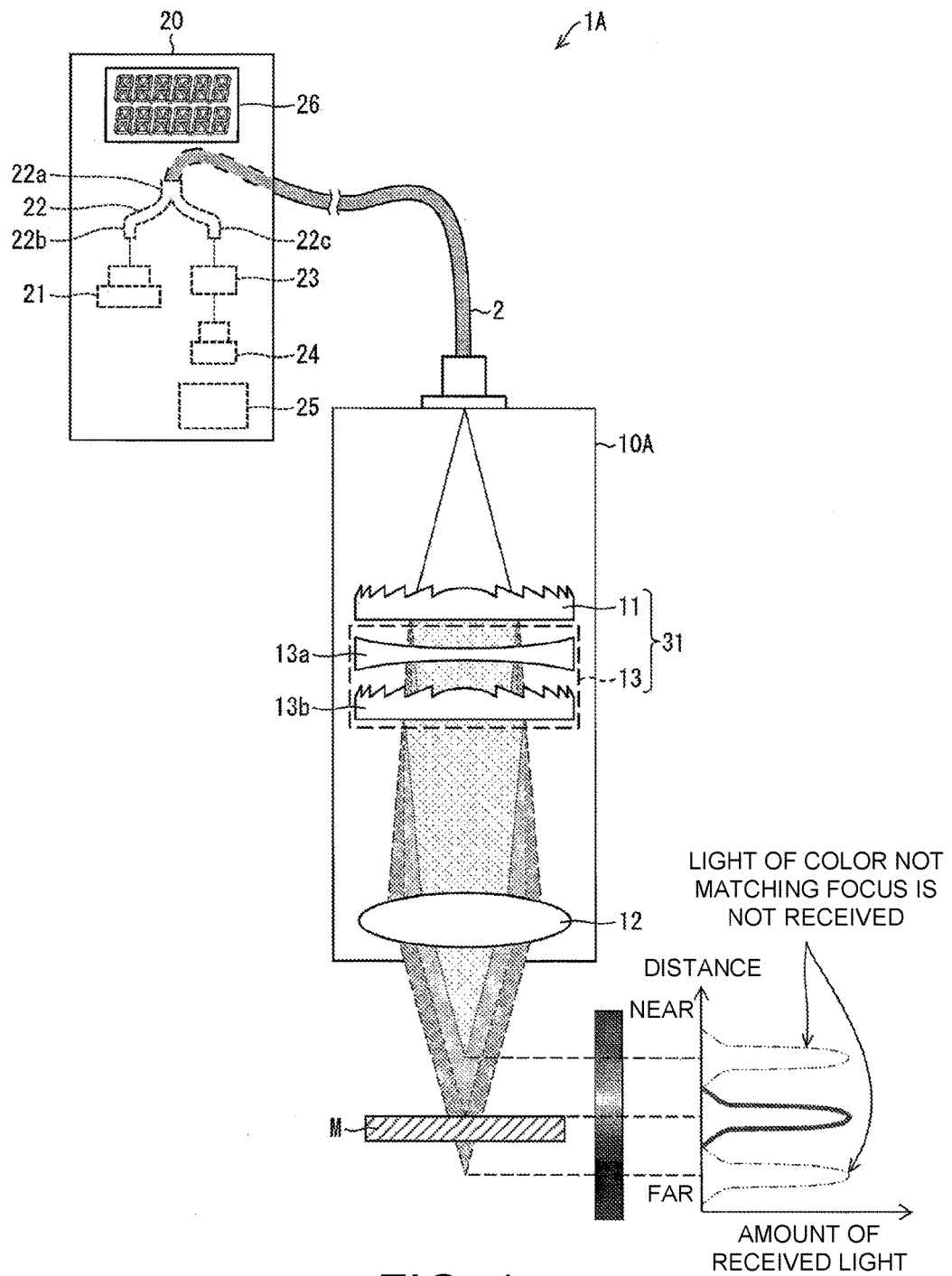
FIG. 1 illustrates a confocal measuring device according to one embodiment of the invention and is a schematic diagram illustrating the configuration of the confocal measuring device.

According to one or some exemplary embodiments of the invention, a confocal measuring device capable of enlarging a measurement target range using a compact device configuration is provided.

According to one or some exemplary embodiments of the invention, chromatic aberration generated in light by the first diffractive lens is further increased by the second diffractive lens. Light condensed by the objective lens has large chromatic aberration along the optical axis. For this reason, in-focus positions can be largely different in accordance with wavelengths, and accordingly, the measurement target range can be large. In addition, since the second diffractive lens is used, an increase in the device size can be suppressed.

In the confocal measuring device according to one or some exemplary embodiments of the invention, light incident on the objective lens is configured to be collimated such that the effective diameter of light incident on the objective lens is not changed.

According to the configuration according to one or some exemplary embodiments of the invention, the numerical aperture of the objective lens is hardly changed. For this reason, there is no change in the measurement center distance, and there is no change in the performance of the measurement center distance.

The confocal measuring device may be configured to further include a first divergence optical part at a light source side of the objective lens for diverging light.

When the second diffractive lens is added at the light source side of the objective lens, extra refraction power is added, and the numerical aperture (NA) of the objective lens is changed. The NA of the objective lens has an effect on the performance of measurement. According to one or some exemplary embodiments of the invention, in front of or behind the second diffractive lens, at least some of the convergence of light generated by the second diffractive lens can be cancelled by the first divergence optical part. Therefore, the NA of the objective lens can be increased.

In the confocal measuring device according to one or some exemplary embodiments of the invention, the first divergence optical part may be configured to include at least one concave lens.

In the confocal measuring device according to one or some exemplary embodiments of the invention, when a focal distance of a divergence system is represented as a negative value, a focal distance of the second diffractive lens f1, a focal distance of the first divergence optical part f2, and a distance between the second diffractive lens and the first divergence optical part d satisfy "f1+f2=d."

According to the configuration according to one or some exemplary embodiments of the invention, from a formula of a composite focal distance, when light behind the first diffractive lens is collimated and "f1+f2=d" is satisfied, light incident on the objective lens is also collimated.

In addition, the convergence of light generated by the second diffractive lens in front of and behind the second diffractive lens can be cancelled by the first divergence optical part. Accordingly, the measurement range can be enlarged by adding the second diffractive lens without changing the measurement center distance.

In the confocal measuring device according to one or some exemplary embodiments of the invention, the first divergence optical part may be configured to be arranged between the first diffractive lens and the second diffractive lens, and light may be configured to be collimated between the second diffractive lens and the objective lens.

According to the configuration according to one or some exemplary embodiments of the invention, by causing light to diverge using the first divergence optical part, the optical system can be configured such that light is incident on the second diffractive lens from the focal position of the second diffractive lens. In this way, chromatic aberration can be efficiently generated without changing the measurement center distance.

The confocal measuring device according to one or some exemplary embodiments of the invention may be configured such that the focal distance of the first diffractive lens and the focal distance of the second diffractive lens are the same.

According to the configuration according to one or some exemplary embodiments of the invention, for example, diffractive lenses having the same design can be used as the first diffractive lens and the second diffractive lens. Therefore, the confocal measuring device can be easily manufactured.

In the confocal measuring device according to one or some exemplary embodiments of the invention, the focal distance of the first diffractive lens and the focal distance of the second diffractive lens may be configured to be different from each other.

The confocal measuring device according to one or some exemplary embodiments of the invention may be configured to include a third diffractive lens that increases chromatic aberration of light and a second divergence optical part that causes light to diverge between the first diffractive lens and the objective lens.

According to the configuration according to one or some exemplary embodiments of the invention, by increasing the number of sets of diffractive lenses and divergence optical parts, the chromatic aberration can be further increased. Therefore, the measurement target range can be increased.

According to one or some exemplary embodiments of the invention, a measurement target range can be enlarged using a compact device configuration.

Embodiment 1

In order to enlarge a measurement target range of a confocal measuring device, it is necessary to increase chromatic aberration along an optical axis. However, the accuracy (resolution) of measurement depends on the numerical aperture (NA) of an objective lens. For this reason, when the focal distance of the objective lens is increased, while the measurement target range is enlarged, the accuracy of the measurement is lowered. Meanwhile, by increasing the NA of the diffractive lens, the chromatic aberration can be increased. However, in order to increase the NA of the diffractive lens, it is necessary to decrease the pitch of diffraction grooves. There is a manufacturing limit to decrease the pitch of the diffraction grooves, and accordingly, there is a limit on the NA of the diffractive lens.

An embodiment of the invention will be described below with reference to FIGS. 1 to 6.

(Basic Configuration of Confocal Measuring Device)

A confocal measuring device according to this embodiment measures a distance up to a measurement target object in a non-contact manner by using a confocal optical system. Examples of a measurement target object measured by the confocal measuring device according to this embodiment include a cell gap of a liquid crystal display panel and the like. Here, in a confocal optical system, by arranging a pinhole to take the effect of apertures at a position (image position) conjugate with the focal position of the objective lens, only in-focus light can be detected. In addition, in the confocal optical system, light emitted from a point light source is condensed on the measurement target object in a state in which there is chromatic aberration in the direction of an optical axis by the objective lens. Light condensed and reflected on the surface of the measurement target object is returned in the same optical path and is condensed on the pinhole. In the confocal optical system, reflective light not from the focal point is mostly cut off by the pinhole, and only information of the focal position is acquired. In this way, the confocal optical system has resolution in the optical axis direction, and thus can measurement in the optical axis direction becomes possible.

Figure 2:
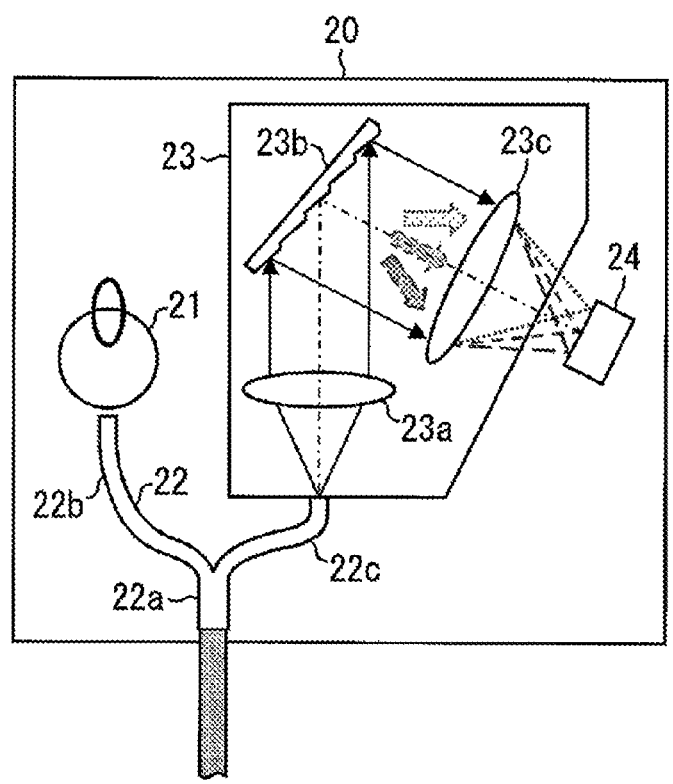
FIG. 2 is a schematic diagram illustrating the internal configuration of a controller of the confocal measuring device.

FIG. 1 is a schematic diagram illustrating the configuration of the confocal measuring device 1A according to this embodiment. FIG. 2 is a schematic diagram illustrating the internal configuration of a controller 20 of the confocal measuring device 1A. The configuration of the confocal measuring device 1A according to this embodiment will be described with reference to FIGS. 1 and 2.

As illustrated in FIG. 1, the confocal measuring device 1A according to this embodiment includes a sensor head 10A that includes a confocal optical system and a controller 20 that is optically connected to the sensor head through an optical fiber cable 2.

The sensor head 10A is equipped with a diffractive lens 11 (first diffractive lens), a chromatic aberration superimposition generating part 13, and an objective lens 12 in this order.

The diffractive lens 11 is an optical element causing chromatic aberration along an optical axis direction for white light that is emitted from a white LED light source 21 (to be described later) as a light source emitting light having a plurality of wavelengths and is incident on the sensor head 10A through the optical fiber cable 2.

The diffractive lens 11 has a configuration in which a pattern causing chromatic aberration along the optical axis direction is formed on a substrate having a single material such as glass or a resin. More specifically, on the surface of the diffractive lens 11, for example, a minute uneven shape such as a wave front shape or a stair shape is periodically formed, or an amplitude-type zone plate in which the transmittance of light periodically changes is formed. The diffractive lens 11 is not limited to the configuration in which a pattern causing chromatic aberration is formed on the substrate having a single material, and for example, may be configured using a plurality of materials. More specifically, the diffractive lens may have a glass substrate and a resin layer having a pattern that is formed on one face of the glass substrate and causes chromatic aberration along the optical axis direction. In such a case, for example, the resin layer can be formed by coating the glass substrate with an ultraviolet curing resin, pressing a mold having a desired pattern on the face coated with the ultraviolet curing resin, and emitting ultraviolet light to cure the ultraviolet curing resin.

In the case of a diffractive lens 11 configured only of glass, a pattern causing chromatic aberration along the optical axis direction is formed by processing hard glass, and accordingly, the manufacturing cost is high. However, in the case of a diffractive lens 11 configured of a glass substrate and a resin layer, a pattern causing chromatic aberration along the optical axis direction is formed by processing the resin layer by using a mold having a desired pattern. For this reason, the manufacturing cost is low.

In addition, in the case of a diffractive lens 11 configured only of a resin, a change in the shape according to an environmental temperature is large, and the temperature characteristics are not good. On the other hand, in the case of the diffractive lens 11 configured of the glass substrate and the resin layer described above, the glass substrate having a small change in the shape according to an environmental temperature occupies most of the configuration. For this reason, the temperature characteristics are good.

The chromatic aberration superimposition generating part 13 generates axial chromatic aberration to overlap the axial chromatic aberration generated by the diffractive lens 11. The chromatic aberration superimposition generating part 13 will be described later in detail.

The objective lens 12 is an optical element that condenses light caused to have chromatic aberration by the diffractive lens 11 and the chromatic aberration superimposition generating part 13 into a measurement target range. The condensed light has chromatic aberration according to the optical axis. The measurement target range is a positional range in the optical axis direction that can be measured by the confocal measuring device 1A. A measurement target object M is arranged in the measurement target range. As the objective lens 12 according to this embodiment, a general optical lens is used. However, the objective lens is not necessarily limited thereto, and for example, an achromatic lens in which a convex lens and a concave lens formed using two types of glass materials having mutually different refractive indexes are adjacently arranged or bonded may be used.

The optical fiber cable 2 guides light emitted from the white LED light source 21 disposed inside the controller 20 to be described later to the sensor head 10A. In order to effectively use light emitted from the optical fiber cable 2 at the diffractive lens 11, the NA of the optical fiber cable 2 and the NA of the diffractive lens 11 may be matched.

In addition, in the confocal measuring device 1A according to this embodiment, the optical fiber cable 2 is an optical path from the controller 20 to the sensor head 10A and also functions as a pinhole. In other words, light having a wavelength that is focused on the measurement target object M among light condensed by the objective lens 12 is focused at the core of the optical fiber cable 2. For this reason, the optical fiber cable 2 functions as a pinhole that shields light having a wavelength not focused on the measurement target object M and passes light focused on the measurement target object M. As a result, in this embodiment, there is an advantage that a pinhole is unnecessary because the optical fiber cable 2 in the optical path from the controller 20 to the sensor head 10A is used.

In addition, in the confocal measuring device 1A according to this embodiment, a configuration in which the optical fiber cable 2 is not used in the optical path from the controller 20 to the sensor head 10A may be employed. However, by using the optical fiber cable 2 in the optical path, the sensor head 10A can be flexibly moved with respect to the controller 20.

The optical fiber cable 2 may use any one of a multi-mode fiber and a single-mode fiber.

The optical fiber cable 2 using the multi-mode fiber has a large fiber diameter, and thus can decrease the loss of light power at the time of transmitting light emitted from the white LED light source 21, whereby measurement can be stably performed with a high S/N ratio even for a measurement target object having low optical reflectance.

On the other hand, the optical fiber cable 2 using the single-mode fiber has a small fiber diameter of several μm and may function as a pinhole. In this way, the half-value width of the waveform of received light can be narrowed, and accordingly, measurement can be performed with high accuracy.

In addition, a bending-resistant fiber may be used in the optical fiber cable 2. The sensor head 10A is frequently attached to a driving part of an electronic component mounting device or the like, and in such a case, the sensor head 10A is moved. For this reason, the optical fiber cable 2 connected to the sensor head 10A is incessantly bent in the moving direction of the sensor head 10A, and thus damage can be prevented by using the bending-resistant fiber.

The controller 20 internally includes a white light emitting diode (LED) light source 21 as a white light source, a branch optical fiber 22, a spectroscope 23, a light receiving element 24, and a processor 25 and externally includes a monitor 26.

The white LED light source 21 is formed by an LED light source, and in this embodiment, is configured to emit white light. Although the white LED light source 21 is used as a light source in this embodiment, the light source is not limited thereto and may be any other light source that can emit light having a plurality of wavelengths.

The branch optical fiber 22 has one optical fiber 22a on a side connected to the optical fiber cable 2 and has two optical fibers 22b and 22c on a side opposite to the optical fiber cable 2. The optical fiber 22b is connected to the white LED light source 21. On the other hand, the optical fiber 22c is connected to the spectroscope 23. As a result, the branch optical fiber 22 guides light emitted from the white LED light source 21 to the optical fiber cable 2 and guides light returning from the sensor head 10A through the optical fiber cable 2 to the spectroscope 23.

As illustrated in FIG. 2, the spectroscope 23 includes a collimator lens 23a, a diffraction grating 23b, and a condensing lens 23c. The collimator lens 23a collimates light returning from the sensor head 10A. The diffraction grating 23b spectrally disperses light collimated by the collimator lens 23a through diffraction. The condensing lens 23c condenses light output from the diffraction grating 23b to a different position of the light receiving element 24 for each wavelength.

As the light receiving element 24, for example, a line complementary metal oxide semiconductor (CMOS) or charge coupled device (CCD) measuring the strength of light output from the spectroscope 23 may be used. Here, in the confocal measuring device 1A according to this embodiment, a measurement part measuring the strength of light returning from the sensor head 10A for each wavelength is configured by the spectroscope 23 and the light receiving element 24. In other words, the measurement part measures the strength of light of a wavelength focused on the measurement target object M among light condensed by the objective lens. In addition, the measurement part may be configured by a single light receiving element 24 such as a CCD as long as it can measure the strength of light returning from the sensor head 10A for each wavelength. Furthermore, the light receiving element 24 may be a two-dimensional CMOS or a two-dimensional CCD.

As illustrated in FIG. 1, the processor 25 is a circuit that controls the operations of the white LED light source 21, the light receiving element 24, and the like. In the processor 25, an output interface, which is not illustrated in the drawing, that outputs signals used for controlling the operation of the white LED light source 21, the light receiving element 24, or the like, and an input interface, which is not illustrated in the drawing, that receives signals from the light receiving element 24, and the like are provided. The processor 25 specifies the wavelength of light focused on the measurement target object M from the strength of light received by each pixel and specifies the position (the position in the optical axis direction) of the measurement target object M from the wavelength. The processor 25 displays the specified position on the monitor 26. The monitor 26 displays the specified position of the measurement target object M based on an instruction from the processor 25.

(Distance Measuring Operation of Confocal Measuring Device)

Next, an operation of measuring a distance to the measurement target object M, which is performed by the confocal measuring device 1A having the configuration described above, will be described with reference to FIG. 1.

As illustrated in FIG. 1, in the confocal measuring device 1A, white light including light having a plurality of wavelengths is emitted from the white LED light source 21. This white light is incident on the diffractive lens 11 of the sensor head 10A through the optical fiber cable 2.

In the diffractive lens 11, chromatic aberration is generated along the optical axis. Light in which chromatic aberration is generated passes through the objective lens 12 to be separated into each color in a height direction (optical axis direction). Light having chromatic aberration along the optical axis is condensed to be separated into so-called rainbow colors. Red light having a long wavelength is condensed near the objective lens 12, and blue light having a short wavelength is condensed further as it goes farther from the objective lens 12. The measurement target range is a range in which light of any wavelength is in focus.

Here, when the measurement target object M is present in the measurement target range of the sensor head 10A, only reflective light having a wavelength focused on the surface of the measurement target object M passes through the confocal optical system (the objective lens 12, the chromatic aberration superimposition generating part 13, and the diffractive lens 11) and is focused on the end face of the optical fiber cable 2. In the controller 20, as illustrated in FIG. 2, reflective light is first incident on the spectroscope 23 and is incident on the light receiving element 24 formed by a CCD or the like through the diffraction grating 23b. Here, in this embodiment, since the optical fiber cable 2 has the function of a pinhole, light having a wavelength not focused on the optical fiber cable 2 is not received.

As a result, in the light receiving element 24 formed by a CCD or the like, a pixel that receives light is changed in the CCD in accordance with the wavelength of the light. For this reason, the processor 25 specifies a pixel by which the wavelength of light focused on the surface of the measurement target object M can be acquired. In the processor 25, a distance from the sensor head 10A (for example, the end face of the sensor head 10A or the objective lens 12) to the measurement target object M is associated with each wavelength by using a conversion equation. For this reason, by using information of the waveform of reception light received by the light receiving element 24 formed by a CCD or the like, the distance from the end face (or the objective lens 12) of the sensor head 10A to the surface of the measurement target object M can be measured. A measured value is displayed on the monitor 26.

In this way, in the confocal measuring device 1A according to this embodiment, colors are separated from each other by the diffractive lens 11 and the chromatic aberration superimposition generating part 13, the position of the measurement target object M in the height direction is measured based on the color (wavelength), and thus a distance to the measurement target object M is acquired.

(Chromatic Aberration Superimposition Generating Part of Confocal Measuring Device)

Next, the chromatic aberration superimposition generating part 13 of the confocal measuring device 1A according to this embodiment will be described below.

Figure 3:
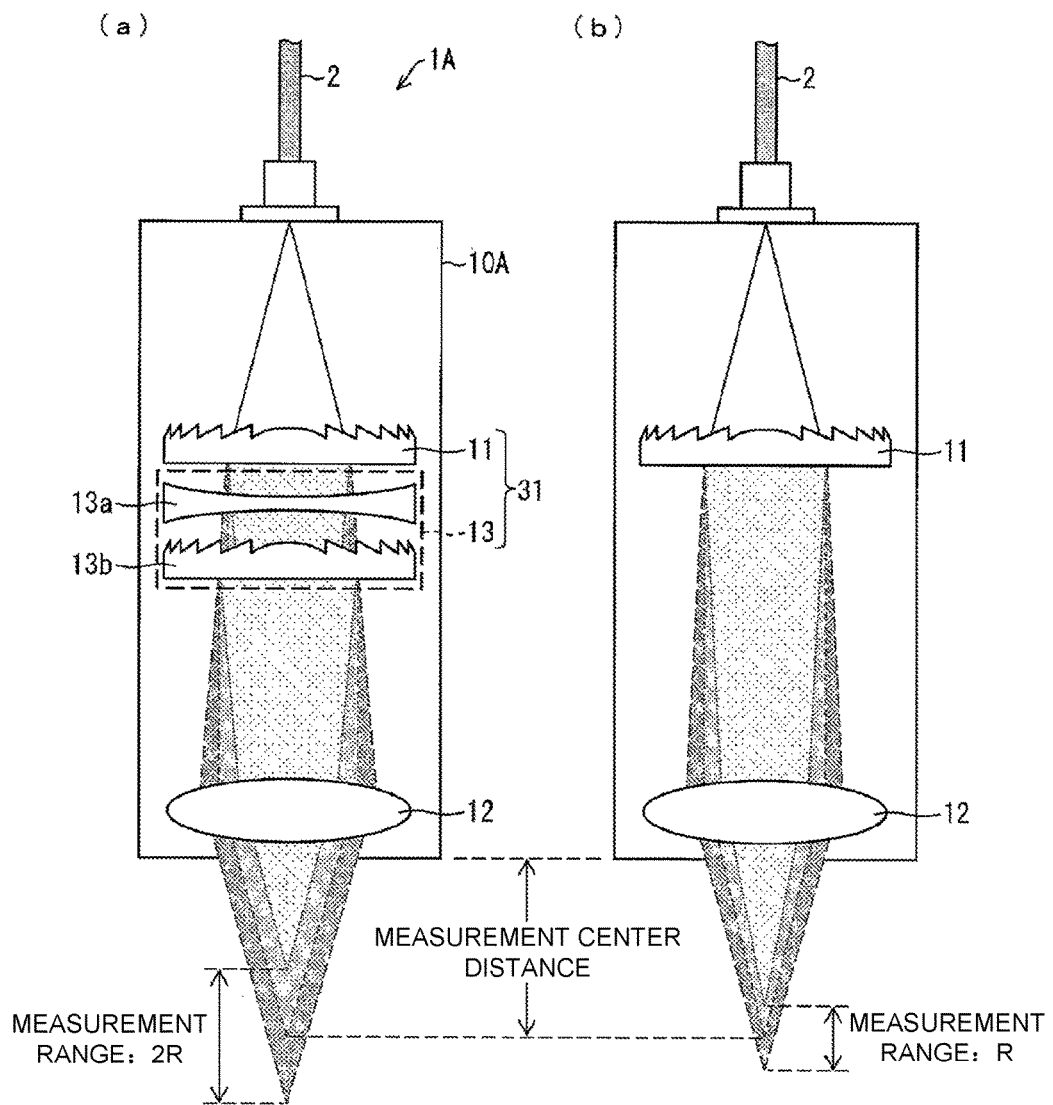
FIG. 3 includes (a) a cross-sectional view illustrating the configuration of a sensor head including a chromatic aberration superimposition generating part of the confocal measuring device, and (b) a cross-sectional view illustrating the configuration of a sensor head excluding the chromatic aberration superimposition generating part.

In FIG. 3, (a) is a cross-sectional view illustrating the configuration of the sensor head 10A including the chromatic aberration superimposition generating part 13 of the confocal measuring device 1A, and (b) is a cross-sectional view illustrating the configuration of the sensor head excluding the chromatic aberration superimposition generating part 13.

As illustrated in (b) of FIG. 3, the sensor head allows light output from the end portion of the optical fiber cable 2 to be incident on the diffractive lens 11 and generates axial chromatic aberration in the diffractive lens 11. A measurement range R (measurement target range) is controlled according to a combination of the focal distance f11 of the diffractive lens 11 and the focal distance f12 of the objective lens 12.

Here, in the confocal measuring device, the measurement range R for measuring a broad range may be increased.

Thus, as a method for increasing the measurement range R, for example, increasing the focal distance f12 of the objective lens 12 may be considered. However, in order to increase the focal distance f12 of the objective lens 12, another objective lens 12 needs to be prepared. In addition, when the focal distance f12 of the objective lens 12 is increased, a measurement center distance increases (in other words, the NA of the objective lens 12 is decreased). For this reason, since the resolution is reduced, the accuracy is degraded.

In addition, as another method for increasing the measurement range R, for example, decreasing the focal distance f11 of the diffractive lens 11 (increasing the NA) may be considered. However, in order to decrease the focal distance f11 of the diffractive lens 11, another diffractive lens 11 needs to be prepared. There is a manufacturing limit on the NA of the diffractive lens 11.

As illustrated in (a) of FIG. 3, in the confocal measuring device 1A according to this embodiment, in addition to the diffractive lens 11, the chromatic aberration superimposition generating part 13 is provided between the diffractive lens 11 and the objective lens 12.

More specifically, the chromatic aberration superimposition generating part 13 according to this embodiment includes a concave lens 13a (first divergence optical part) and a diffractive lens 13b (second diffractive lens). The concave lens 13a is disposed at a position on the diffractive lens 11 side with respect to the diffractive lens 13b, in other words, on a side opposite to the objective lens 12, in other words, a position on the negative side. The concave lens 13a is a divergence optical element that causes light to diverge.

Here, when the focal distance of the diffractive lens 13b is f1, the focal distance of the concave lens 13a is f2, and a distance between the diffractive lens 13b and the concave lens 13a is d, "f1+f2=d" is satisfied. In this way, from a formula of a composite focal distance, when light behind the diffractive lens 11 is collimated, light (light output from the diffractive lens 13b) incident on the objective lens 12 is collimated as well. Here, the focal distance of a divergence system is represented as a negative value.

In addition, the focal distance is a value for a representative wavelength included in white light. The representative wavelength is not particularly limited as long as it is a wavelength of light focused in the measurement range. Here, the wavelength of light focused at the center of the measurement range (a wavelength of approximately the center of the wavelength range of white light) will be set as the representative wavelength.

The light passing through the diffractive lens 11 is collimated between the diffractive lens 11 and the concave lens 13a. The collimated light diverges according to the concave lens 13a and is incident on the diffractive lens 13b. The light diverged by the concave lens 13a is incident on the diffractive lens 13b at the same angle as that at which light is incident from the focal position of the diffractive lens 13b on the diffractive lens 13b. The diffractive lens 13b increases the chromatic aberration of light passing through it. The light passing through the diffractive lens 13b is collimated between the diffractive lens 13b and the objective lens 12. The objective lens 12 condenses the light passing through the diffractive lens 13b into a measurement range along the optical axis such that the condensed light has chromatic aberration along the optical axis. More precisely, according to the generated chromatic aberration, the advancing direction of light is different for each wavelength, and light having the representative wavelength becomes parallel light between the diffractive lens 11 and the concave lens 13a and between the diffractive lens 13b and the objective lens 12.

As a result, the focal distance f31 of a diffractive lens group 31 that is acquired when the diffractive lens 11 and the chromatic aberration superimposition generating part 13 are combined is not different from the focal distance f11 of the diffractive lens 11. Accordingly, even when the diffractive lens 11 and the chromatic aberration superimposition generating part 13 are combined, the measurement center distance of the objective lens 12 does not change.

Meanwhile, in this embodiment, the axial chromatic aberration is generated by the diffractive lens 11, and axial chromatic aberration is also generated by the chromatic aberration superimposition generating part 13 in an overlapping manner. Both the diffractive lens 11 and a diffractive lens 13b have the same focal distance, and light after the diffractive lens 13b is collimated. As a result, the measurement range of the confocal measuring device 1A is enlarged to be about twice (2R) that (R) of case where the chromatic aberration superimposition generating part 13 is not present.

Figure 4A:
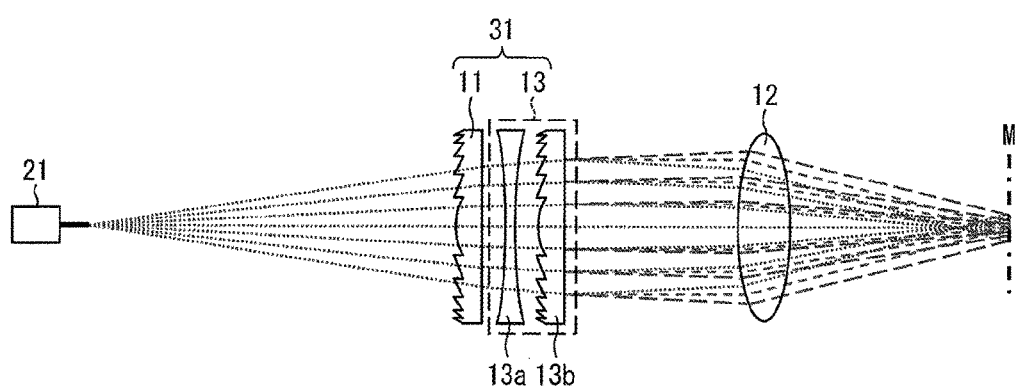
FIG. 4(a) is a diagram illustrating the optical path of the sensor head of the confocal measuring device.
Figure 4B:
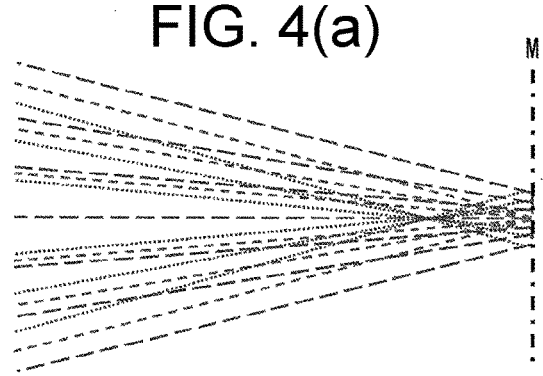
FIG. 4(b) is a diagram illustrating in-focus positions of a plurality of wavelengths near a measurement target object.
Figure 5A:
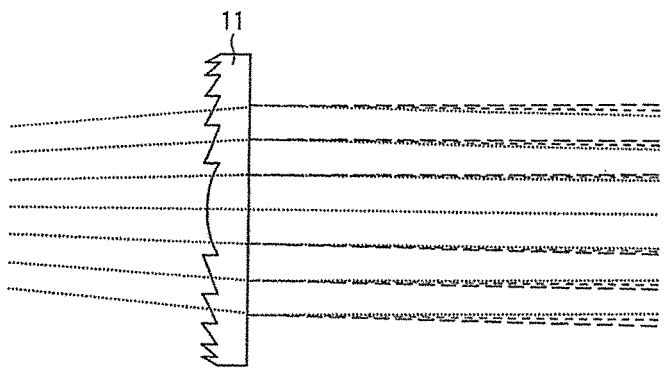
FIG. 5(a) is a diagram illustrating an optical path passing through a diffractive lens of the sensor head of the confocal measuring device.
Figure 5B:
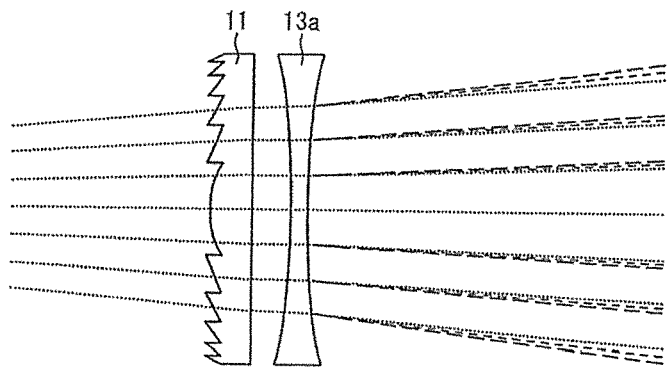
FIG. 5(b) is a diagram illustrating an optical path passing through the diffractive lens and a concave lens of the sensor head.
Figure 5C:
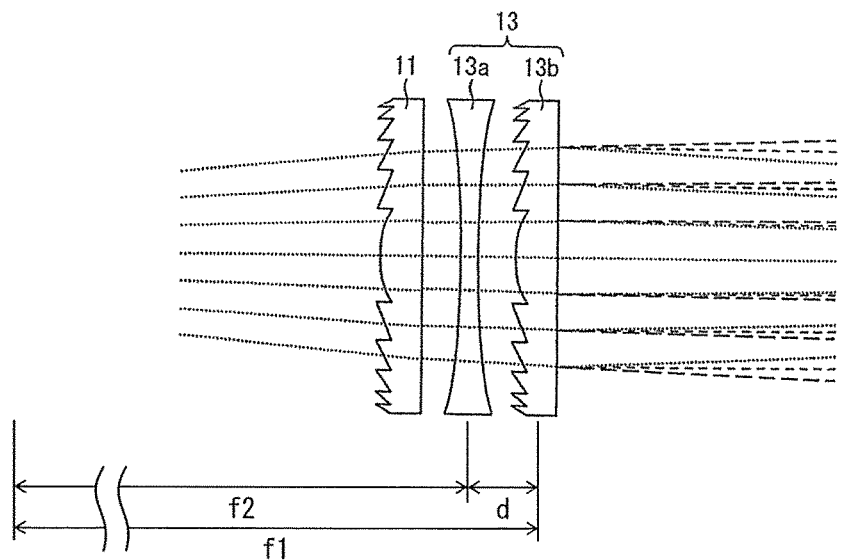
FIG. 5(c) is a diagram illustrating an optical path passing through the diffractive lens and the chromatic aberration superimposition generating part of the sensor head.

FIG. 4(a) is a diagram illustrating the optical path of the sensor head 10A of the confocal measuring device 1A. FIG. 4(b) is a diagram illustrating in-focus positions of a plurality of wavelengths near a measurement target object M. FIG. 5(a) is a diagram illustrating an optical path passing through the diffractive lens 11 of the sensor head 10A of the confocal measuring device 1A. FIG. 5(b) is a diagram illustrating an optical path passing through the diffractive lens 11 and the concave lens 13a of the sensor head 10A. FIG. 5(c) is a diagram illustrating an optical path passing through the diffractive lens 11 and the chromatic aberration superimposition generating part 13 of the sensor head 10A.

As illustrated in FIGS. 4(a) and 4(b), light of various wavelengths is emitted from the white LED light source 21. This light passed through the diffractive lens 11, the chromatic aberration superimposition generating part 13, and the objective lens 12 is reflected (scattered) by the measurement target object M. At this time, while the objective lens 12 condenses light, an in-focus position is different in accordance with the wavelength due to the generated chromatic aberration. Then, the light that is focused and reflected by the measurement target object M advances in a direction opposite to that of the original optical path.

As illustrated in FIG. 5(a), when the optical path is verified for each lens, among light passing through the diffractive lens 11 of the focal distance f11, light having the representative wavelength advances in parallel, and the other light advances while converging or diverging.

As illustrated in FIG. 5(b), in a case where the concave lens 13a of the focal distance f2 is present on the objective lens 12 side of the diffractive lens 11, light emitting from the concave lens 13a slightly diverges and advances. In other words, the concave lens 13a is positioned between the diffractive lens 11 and the diffractive lens 13b and guides parallel light incident from the diffractive lens 11 to the diffractive lens 13b as if the parallel light is emitted from the focal position of the diffractive lens 13b.

As illustrated in FIG. 5(c), in a case where the diffractive lens 13b of the focal distance f1 is present on the objective lens 12 side of the concave lens 13a, for the light having the axial chromatic aberration generated by the diffractive lens 11, axial chromatic aberration is generated by the diffractive lens 13b in an overlapping manner. The diffractive lens 13b further increases the chromatic aberration of the incident light. Among the light passing through the diffractive lens 13b of the focal distance f1, light having the representative wavelength advances in parallel, and the other light advances while converging or diverging. As a result, the light has chromatic aberration larger than the chromatic aberration generated by the diffractive lens 11 and is guided to the objective lens 12.

As the focal distance f11 of the diffractive lens 11 is decreased, the axial chromatic aberration increases. For this reason, in a case where the diffractive lens 11 of the focal distance f11 that is a manufacturing limit is employed, when a diffractive lens of the same focal distance f1 is used as the diffractive lens 13b, the measurement range becomes the largest.

In this way, in the confocal measuring device 1A according to this embodiment, since light is collimated and incident to the objective lens 12, a larger measurement range can be acquired without changing the measurement center distance.

Figure 6:
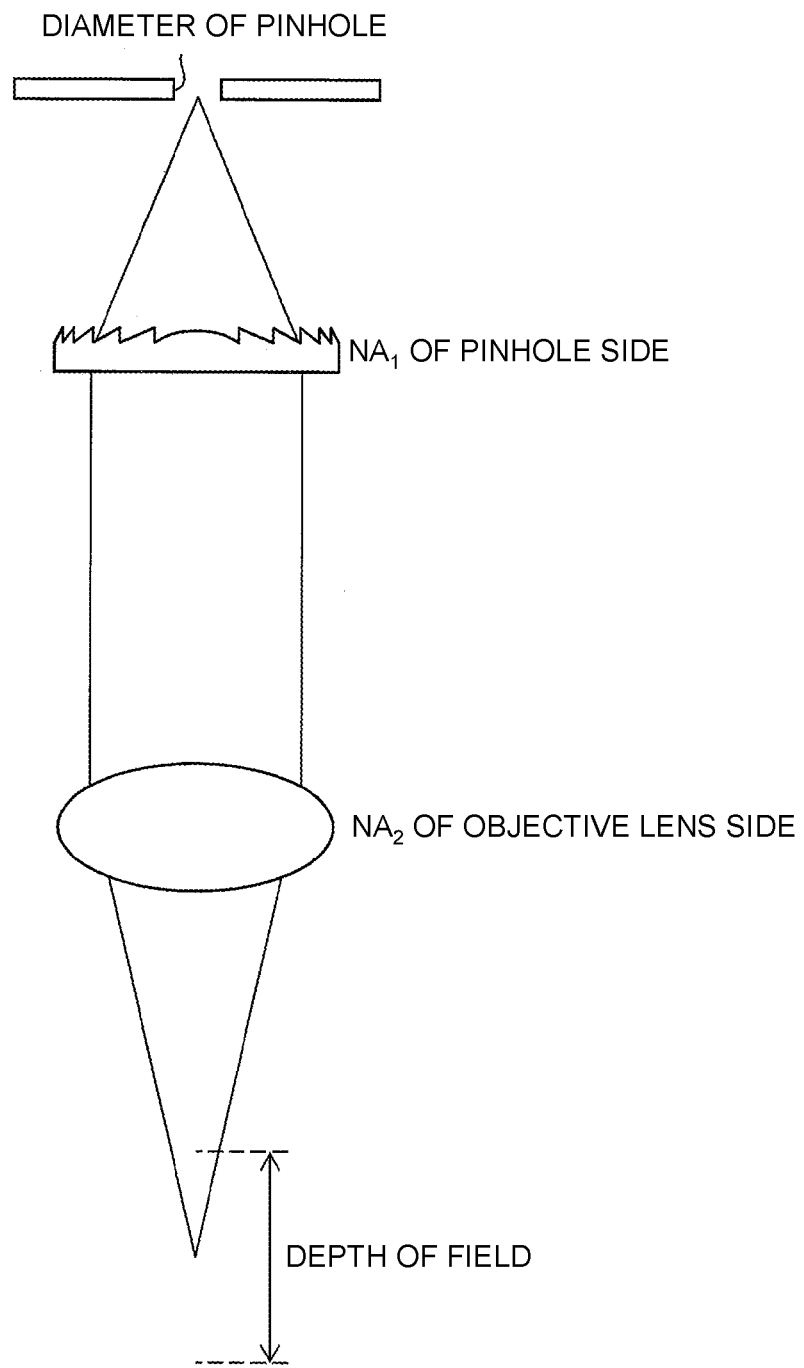
FIG. 6 is a reference diagram illustrating a configuration acquired by eliminating the chromatic aberration superimposition generating part from the sensor head of the confocal measuring device.

FIG. 6 is a reference diagram illustrating a configuration acquired by eliminating the chromatic aberration superimposition generating part 13 from the sensor head 10A of the confocal measuring device 1A.

The measurement range may be increased while the performance of the confocal measuring device is maintained. Here, no change in the performance within the measurement range represents no change in the half-value whole width of the strength of light received by a light receiving element according to a wavelength. In other words, it represents that the numerical aperture $NA_2$ of the objective lens 12 side is constant.

A difference in the half-value whole width within the measurement range occurs due to a difference in the numerical aperture $NA_2$ on the objective lens 12 side according to the wavelength. The half-value whole width is determined based on a depth of field and is determined based on the diameter of the pinhole, the numerical aperture $NA_1$ of the pinhole side, and the numerical aperture $NA_2$ of the objective lens 12. Here, since the diameter of the pinhole and the numerical aperture $NA_1$ of the pinhole side are common to any wavelength, the wavelength dependency of the numerical aperture $NA_2$ of the objective lens 12 is a factor for a change in the half-value whole width.

However, by adding the chromatic aberration superimposition generating part 13, when the numerical aperture $NA_2$ of the objective lens 12 is changed, the accuracy changes. In a case where only the diffractive lens 13b is added between the diffractive lens 11 and the objective lens 12, extra refraction power is added, and thus, the focal distance (=measurement center distance) of the objective lens 12 side is changed, whereby the numerical aperture $NA_2$ is changed as well.

Thus, in this embodiment, in order to prevent the problem described above, the concave lens 13a is added. In other words, the refractive power of the added diffractive lens 13b is negated by the concave lens 13a.

Embodiment 2

Another embodiment of the invention will be described as below with reference to FIG. 7. A configuration not described in this embodiment is the same as that of the Embodiment 1 described above. For the convenience of description, the same reference numeral is assigned to a member having the same function as that of the member according to the above-described Embodiment 1 illustrated in the drawings, and the description thereof will not be presented here.

In the confocal measuring device 1A according to Embodiment 1 described above, one chromatic aberration superimposition generating part 13 is added in the sensor head 10A in addition to the diffractive lens 11. In contrast to this, in a confocal measuring device B according to this embodiment, two chromatic aberration superimposition generating parts 13 are provided in a sensor head 10B, which is different from Embodiment 1. The configuration of the confocal measuring device 1B according to this embodiment will be described below.

Figure 7:
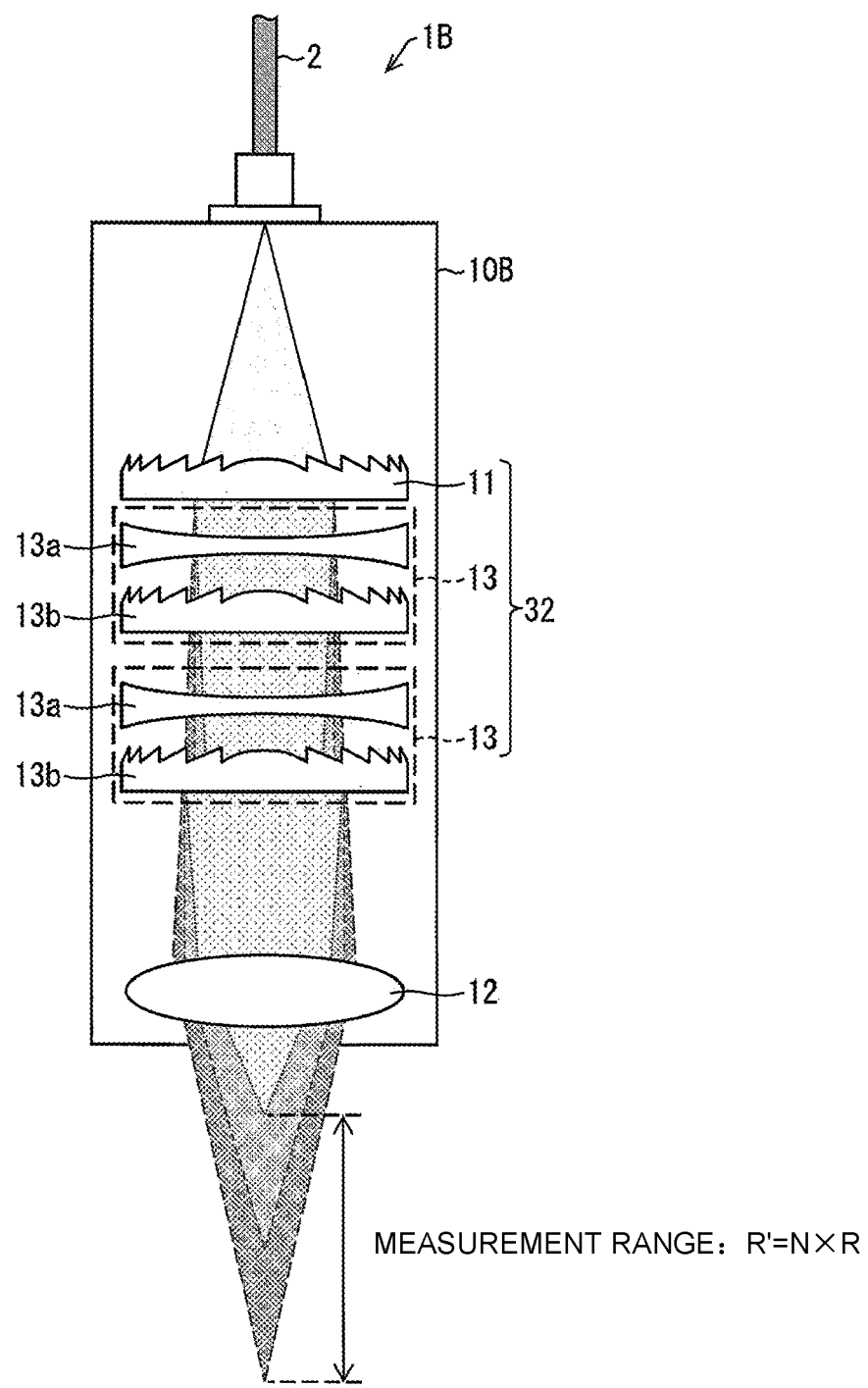
FIG. 7 illustrates a confocal measuring device according to another embodiment of the invention and is a schematic diagram illustrating the configuration of a sensor head of the confocal measuring device.

FIG. 7 is a cross-sectional view illustrating the configuration of the sensor head 10B of the confocal measuring device 1B according to this embodiment.

As illustrated in FIG. 7, in the sensor head 10B of the confocal measuring device 1B according to this embodiment, in addition to a diffractive lens 11, two chromatic aberration superimposition generating parts 13 and 13 are added between the diffractive lens 11 and an objective lens 12. Each chromatic aberration superimposition generating part 13, as described in Embodiment 1, is formed by combining a concave lens 13a and a diffractive lens 13b. Here, the two chromatic aberration superimposition generating parts 13 and 13 are the same. In any one of the chromatic aberration superimposition generating parts 13, for the focal distance f11 of the diffractive lens 11, the focal distance of the concave lens 13a is f2, and the focal distance of the diffractive lens 13b is f1. Similar to Embodiment 1, when a distance between the diffractive lens 13b and the concave lens 13a is denoted by d, "f1+f2=d" is satisfied.

In this way, in the chromatic aberration superimposition generating part 13 of the diffractive lens 11 side, based on the focal distance f2 of the concave lens 13a and the focal distance f1 of the diffractive lens 13b, when collimated light is incident to the chromatic aberration superimposition generating part 13, collimated light is output from the chromatic aberration superimposition generating part 13.

In this way, in a case where a plurality of the chromatic aberration superimposition generating parts 13 are provided, it is important to collimate light to be incident to the objective lens 12. In this way, the measurement range can be efficiently enlarged without changing the measurement center distance.

As a result, the focal distance of a diffractive lens group 32 acquired by combining the diffractive lens 11 and the two chromatic aberration superimposition generating parts 13 and 13 is a focal distance f32 that is the same as the focal distance f11 of the diffractive lens 11.

Accordingly, the focal distance f32 of the diffractive lens group 32 acquired by combining the diffractive lens 11 and the two chromatic aberration superimposition generating parts 13 and 13 is not changed from the focal distance f11 of only the diffractive lens 11. For this reason, the measurement center distance of the objective lens 12 is not changed.

However, since the two diffractive lenses 13b are added for the diffractive lens 11, axial chromatic aberration generated by the diffractive lens 11 has three-times magnitude. As a result, the measurement range is enlarged R'=3×R.

In other words, in this embodiment, since a total number of the diffractive lens 11 and the diffractive lenses 13b and 13b is three, the measurement range R'=3×R.

Thus, generally, when a total number of the diffractive lens 11 and the diffractive lenses 13b is N (here, N is a positive integer), the measurement range R'=N×R. For this reason, it can be understood that the measurement range R' of the confocal measuring device 1B is N times the measurement range of the case of only the diffractive lens 11. In other words, when the number of the diffractive lenses 11 and the diffractive lenses 13b of the diffractive lens group 32 is N, the chromatic aberration becomes N times, and, in the case of being combined with the same objective lens 12, the measurement range R' becomes N times while the measurement center distance is maintained to be the same.

In this way, in the confocal measuring device 1B according to this embodiment, a configuration may be employed in which an arbitrary number of sets of chromatic aberration superimposition generating parts 13 are present in a case where "f1+f2=d" is satisfied when the focal distance of the concave lens 13a of the chromatic aberration superimposition generating part 13 is f2, the focal distance of the diffractive lens 13b is f1, and a distance between the two lenses is d. In addition, the number of added concave lenses 13a is arbitrary.

Modified Example

The arrangement order of two concave lenses 13a and two diffractive lenses 13b is not limited to that of the example illustrated in the drawing and may be an arbitrary arrangement order. For example, the lenses may be aligned in the arrangement order of the diffractive lens 11, the diffractive lens 13b, the diffractive lens 13b, the concave lens 13a, the concave lens 13a, and the objective lens 12.

In addition, among a plurality of chromatic aberration superimposition generating parts 13, the focal distance of the concave lens 13a (and the diffractive lens 13b) of one chromatic aberration superimposition generating part 13 and the focal distance of the concave lens 13a (and the diffractive lens 13b) of another chromatic aberration superimposition generating part 13 may be different from each other. Furthermore, a positional relation between the concave lens 13a and the diffractive lens 13b of one chromatic aberration superimposition generating part 13 and a positional relation between the concave lens 13a and the diffractive lens 13b of another chromatic aberration superimposition generating part 13 may be different from each other. However, in a case where light after the diffractive lens 13b is not collimated, the chromatic aberration is not efficiently superimposed, and, even when N chromatic aberration superimposition generating parts 13 are added, the measurement range R' is not (original measurement range R)*(N+1).

Embodiment 3

A yet another embodiment of the invention will be described as below with reference to FIG. 8. A configuration not described in this embodiment is the same as that of the Embodiment 1 and Embodiment 2 described above. For the convenience of description, the same reference numeral is assigned to a member having the same function as that of the member according to the above-described Embodiment 1 and Embodiment 2 illustrated in the drawings, and the description thereof will not be presented here.

In the confocal measuring device 1A according to Embodiment 1, one chromatic aberration superimposition generating part 13 is provided in the sensor head 10A. In addition, the focal distance of the diffractive lens 13b of the chromatic aberration superimposition generating part 13 is the focal distance f1 that is the same as the focal distance f11 of the diffractive lens 11.

In contrast to this, in a confocal measuring device 1C according to this embodiment, while one chromatic aberration superimposition generating part 14 is added in a sensor head 10C in addition to a diffractive lens 11, which is the same as that of Embodiment 1, the focal distance of a diffractive lens 14b of the chromatic aberration superimposition generating part 14 is a focal distance f3 that is different from the focal distance f1 of a diffractive lens 13b, which is different from that of Embodiment 1. The configuration of the confocal measuring device 1C according to this embodiment will be described below.

Figure 8:
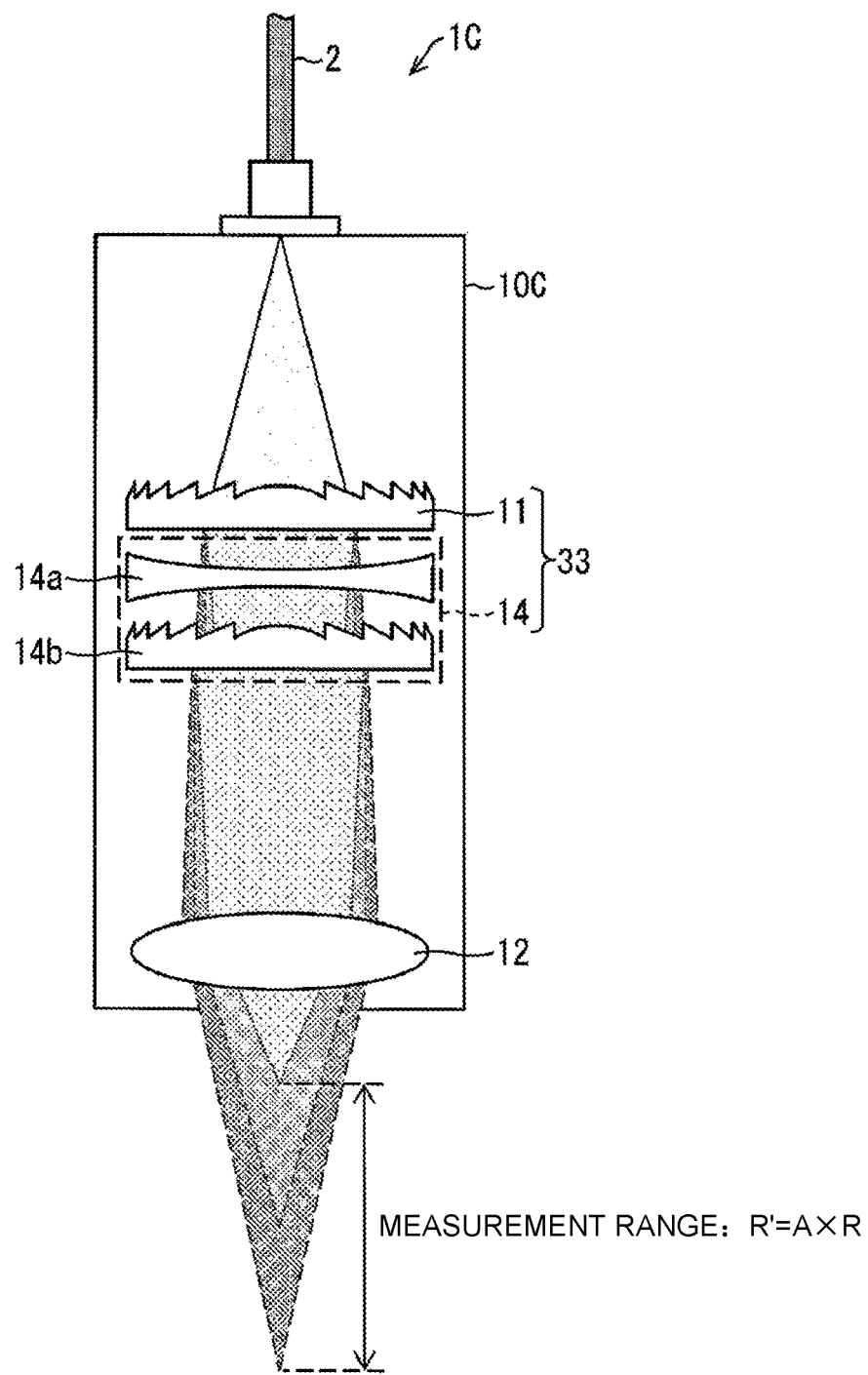
FIG. 8 illustrates a confocal measuring device according to yet another embodiment of the invention and is a cross-sectional view illustrating the configuration of a sensor head of the confocal measuring device.

FIG. 8 is a cross-sectional view illustrating the configuration of the sensor head 10C of the confocal measuring device 1C according to this embodiment.

As illustrated in FIG. 8, one chromatic aberration superimposition generating part 14 is added in the sensor head 10C of the confocal measuring device 1C according to this embodiment in addition to the diffractive lens 11. Here, in this embodiment, the focal distance of the diffractive lens 14b (third diffractive lens) of the chromatic aberration superimposition generating part 14 is a focal distance f3 that is different from the focal distance f11 of the diffractive lens 11 (first diffractive lens). In correspondence with the focal distance f3 of this diffractive lens 14b, when the focal distance f4 of the concave lens 14a (second divergence optical part) satisfies "f3+f4=d (inter-lens distance)", the convergence of the diffractive lens 14b is cancelled by the concave lens 14a in the chromatic aberration superimposition generating part 14. In this way, the light passing through the diffractive lens 14b is collimated.

As a result, the focal distance of a diffractive lens group 33 acquired by combining the diffractive lens 11 and one chromatic aberration superimposition generating part 14 is a focal distance f33 that is the same as the focal distance f11 of the diffractive lens 11. For this reason, the measurement center distance of the objective lens 12 is not changed.

In this embodiment, the diffractive lens 11 and the diffractive lens 14b of which the focal distances are different from each other are combined. Accordingly, chromatic aberration generated in the diffractive lens 11 becomes A times (here, A is a real number of "1" or more). As a result, the measurement range R'=A×R. In the confocal measuring device 1C according to this embodiment, the measurement range can be freely changed.

Therefore, according to the configuration of this confocal measuring device 1C, similar to the confocal measuring device 1B according to Embodiment 2, an enlarged measurement range can be acquired. In the case of this embodiment, since the number of chromatic aberration superimposition generating parts 14 is not increased, the configuration of the confocal measuring device 1B can be simplified in the confocal measuring device 1C.

In this embodiment, although it is premised that the number of chromatic aberration superimposition generating parts 14 is not increased, in one or some exemplary embodiments of the invention of the invention, the number of chromatic aberration superimposition generating parts 14 may be increased without necessarily being limited thereto.

Modified Example

The chromatic aberration superimposition generating part 13 according to Embodiment 2 may be additionally added to the confocal optical system of the confocal measuring device 1C. In this way, the diffractive lens 13b of the focal distance f1 and the diffractive lens 14b of the focal distance f3 may be arranged.

The invention is not limited to each embodiment described above, and various changes can be made in a range represented in the claims, and an embodiment acquired by appropriately combining technical means disclosed in different embodiments also belongs to the technical scope of the invention.

What is claimed is:

1. A confocal measuring device using a confocal optical system, the confocal measuring device comprising:
    a light source that emits light having a plurality of wavelengths;
    a first diffractive lens that causes chromatic aberration in the light emitted from the light source;
    a second diffractive lens that increases chromatic aberration of light passing through the first diffractive lens;
    an objective lens that condenses light passing through the second diffractive lens into a measurement target range along an optical axis such that the condensed light has chromatic aberration along the optical axis;
    a measurement part that measures strength of light of a wavelength focused on a measurement target object among light condensed by the objective lens; and
    a first divergence optical part at an objective lens side of the first diffractive lens for diverging light.

2. The confocal measuring device according to claim 1, wherein light incident on the objective lens is collimated.

3. The confocal measuring device according to claim 2, wherein the first divergence optical part is at a light source side of the objective lens for diverging light.

4. The confocal measuring device according to claim 3, wherein the first divergence optical part includes at least one concave lens.

5. The confocal measuring device according to claim 4, wherein, when a focal distance of a divergence system is represented as a negative value, a focal distance of the second diffractive lens f1, a focal distance of the first divergence optical part f2, and a distance between the second diffractive lens and the first divergence optical part d satisfies $$f1+f2=d.$$

6. The confocal measuring device according to claim 5, wherein the first divergence optical part is arranged between the first diffractive lens and the second diffractive lens, and
    wherein light is collimated between the second diffractive lens and the objective lens.

7. The confocal measuring device according to claim 3, wherein, when a focal distance of a divergence system is represented as a negative value, a focal distance of the second diffractive lens f1, a focal distance of the first divergence optical part f2, and a distance between the second diffractive lens and the first divergence optical part d satisfies $$f1+f2=d.$$

8. The confocal measuring device according to claim 7, wherein the first divergence optical part is arranged between the first diffractive lens and the second diffractive lens, and
    wherein light is collimated between the second diffractive lens and the objective lens.

9. The confocal measuring device according to claim 3, wherein the first divergence optical part is arranged between the first diffractive lens and the second diffractive lens, and
    wherein light is collimated between the second diffractive lens and the objective lens.

10. The confocal measuring device according to claim 1, wherein the first divergence optical part is at a light source side of the objective lens for diverging light.

11. The confocal measuring device according to claim 10, wherein the first divergence optical part includes at least one concave lens.

12. The confocal measuring device according to claim 11, wherein, when a focal distance of a divergence system is represented as a negative value, a focal distance of the second diffractive lens f1, a focal distance of the first divergence optical part f2, and a distance between the second diffractive lens and the first divergence optical part d satisfies $$f1+f2=d.$$

13. The confocal measuring device according to claim 12, wherein the first divergence optical part is arranged between the first diffractive lens and the second diffractive lens, and
    wherein light is collimated between the second diffractive lens and the objective lens.

14. The confocal measuring device according to claim 11, further comprising a third diffractive lens that increases chromatic aberration of light and a second divergence optical part that causes light to diverge provided between the first diffractive lens and the objective lens.

15. The confocal measuring device according to claim 10, wherein, when a focal distance of a divergence system is represented as a negative value, a focal distance of the second diffractive lens f1, a focal distance of the first divergence optical part f2, and a distance between the second diffractive lens and the first divergence optical part d satisfies $$f1+f2=d.$$

16. The confocal measuring device according to claim 15, wherein the first divergence optical part is arranged between the first diffractive lens and the second diffractive lens, and
    wherein light is collimated between the second diffractive lens and the objective lens.

17. The confocal measuring device according to claim 10, wherein the first divergence optical part is arranged between the first diffractive lens and the second diffractive lens, and
    wherein light is collimated between the second diffractive lens and the objective lens.

18. The confocal measuring device according to claim 10, further comprising a third diffractive lens that increases chromatic aberration of light and a second divergence optical part that causes light to diverge provided between the first diffractive lens and the objective lens.

19. The confocal measuring device according to claim 1, wherein the focal distance of the first diffractive lens and the focal distance of the second diffractive lens are the same.

20. The confocal measuring device according to claim 1, wherein the focal distance of the first diffractive lens and the focal distance of the second diffractive lens are different from each other.

* * * * *